…

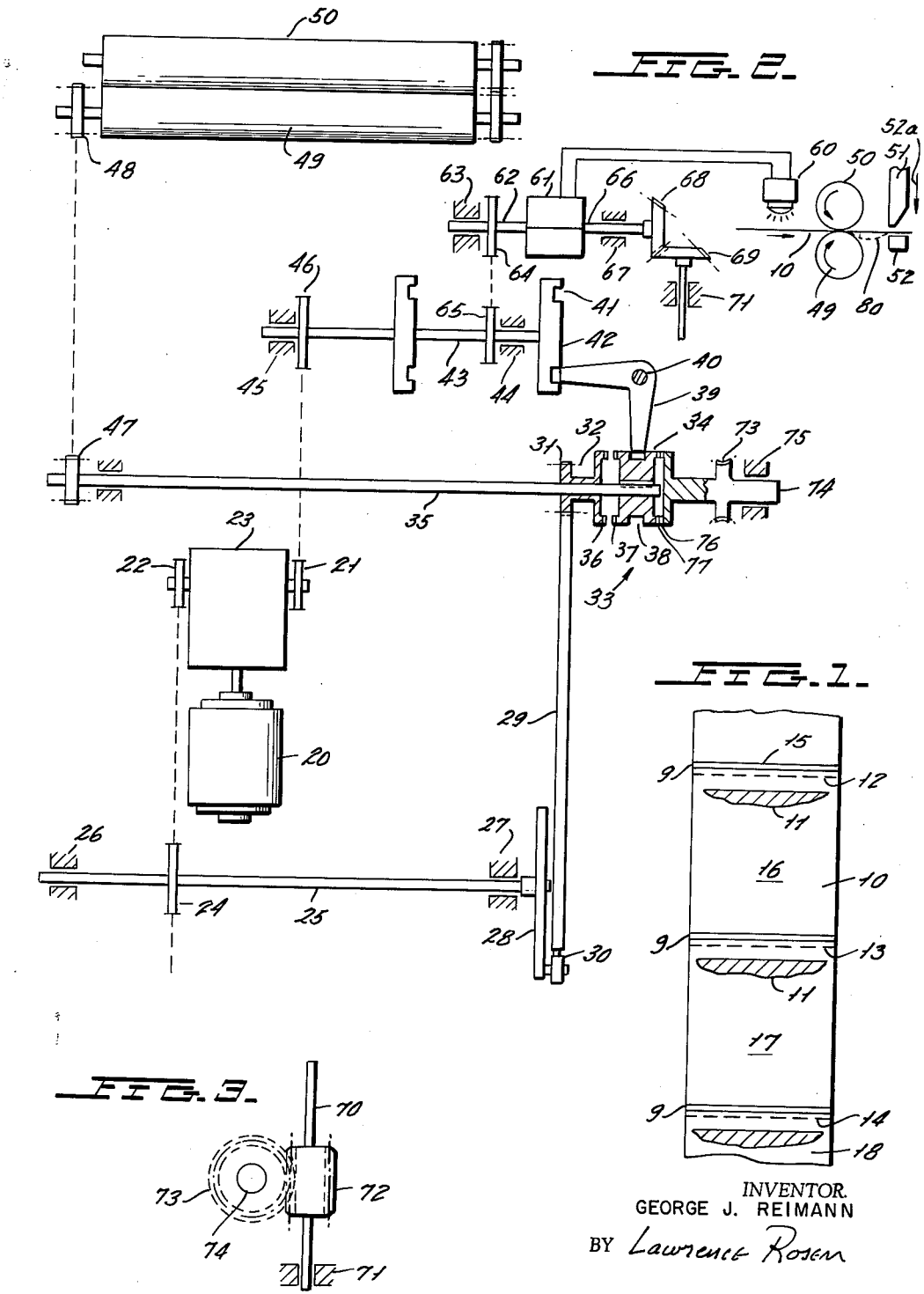

3,204,842
INDEXING MECHANISM
George J. Reimann, Pittsford, N.Y., assignor to National
 Distillers and Chemical Corporation, New York, N.Y.,
 a corporation of Virginia
Filed Sept. 19, 1962, Ser. No. 224,698
2 Claims. (Cl. 226—27)

This invention relates to an indexing mechanism, and more specifically relates to a novel drive mechanism for moving a web with respect to a cutting means wherein the major portion of the web motion occurs through a direct acting mechanism while an auxiliary control mechanism positions the web with high accuracy to receive a cutting and sealing operation at some accurately located point with respect to printed matter, or the like, on the web.

In the production of bags of thermoplastic material such as polyester or polypropylene material, a tube of the plastic film is drawn through a cutting mechanism which continually seals and cuts transverse to the axis of the tube. In some cases, the cut is merely a perforation so that a roll of bags can be produced for a consumer where the bags are torn off at the perforation with the seal adjacent the dotted line serving as the bottom of the adjacent bag.

Where the individual bags have printed matter impressed thereon, it is necessary to obtain accurate indexing so that the seal and perforated line impression are formed at a correct position.

The present invention provides a novel drive mechanism which drives the web with respect to a seal bar whereby the major portion of the bag length is passed through the seal bar and thereafter an automatic adjusting mechanism connected to print responsive indicating means moves the web until the seal bar and cutting means are at a proper relationship with respect to some predetermined point of the printed matter. By way of example, a photosensitive switch can be connected to operate a clutch which controls an auxiliary drive mechanism. The printed matter of the bag will actuate the photoswitch and thus the drive mechanism so the web moves until it is at a predetermined position where the photosensitive switch is opened. The seal bar is then operated with the web properly located.

In a preferred embodiment of the invention, the fine adjustment of the web position occurs while the sealing operation is being performed on the portion of the tube immediately in front of the portion being measured. That is to say, a certain length of time is required for the sealing and perforating operation during which the web has been stopped. The web adjustment occurs during this sealing operation whereby no time is lost during production in making the critical adjustment. When the web is then moved for the length of the next bag, the print on this bag will be properly located with respect to the seal element because of the accurate adjustment of the preceding operation.

Accordingly, a primary object of this invention is to provide a novel indexing mechanism.

A further object of this invention is to provide a novel indexing mechanism in which fine adjustment of the web position is achieved with no lost time.

Another object of this invention is to provide a novel indexing mechanism in which an auxiliary clutch connected to a web driving means is actuated by a photoswitch which measures the printing on the web to accurately position the web.

A further object of this invention is to provide a novel index mechanism for moving a web of material with respect to an operating device where the web is moved by a first constant gross distance and a second finely adjusted distance with the fine adjustment occurring during operation of the operating device.

These and other objects of this invention will become apparent from the following description when taken in connection with the drawings, in which:

FIGURE 1 shows a top plan view of a portion of a web of a tube of thermoplastic film.

FIGURE 2 schematically illustrates the novel indexing system of the present invention.

FIGURE 3 illustrates the manner in which the output of the auxiliary drive is connected to the main drive.

Referring first to Figure 1, I have shown therein a flattened tube 10 of a thermoplastic film which has a pattern 11 repetitively printed thereon. The web 10 is adapted to be sealed closed over areas 9 and perforated under the seal at dotted line sections 12, 13 and 14 to thereby produce a plurality of bags such as bags 15, 16, 17 and 18 which can be opened when torn from the web along the perforated lines.

Thus, the continuous web 10 may be wound in a roll, whereby a consumer can tear the individual bags along their respective dotted lines, the areas 9 forming the bottoms of the bags, and the areas below the dotted lines 12, 13 and 14 being openable. The bag formation by this method is well known to those skilled in the art and need not be given in any further detail here.

FIGURE 2 illustrates the drive mechanism to which the novel indexing mechanism of the invention may be applied.

Referring now to FIGURE 2, the source of power for the system is comprised of a D.-C. motor 20 which is connected to a first and second output sprocket 21 and 22 through the speed reducer 23. The output sprocket 22 is connected to a sprocket 24 of crank shaft 25 which is pivotally mounted in bearings 26 and 27, and has an output crank arm 28. The output crank arm 28 is pivotally connected to a rack 29 at pivot 30 where the rack 29 engages the gear 31 of clutch section 32 of clutch 33. The clutch 23 has a second clutch section 34 which is keyed to shaft 35 so that section 34 is axially movable along the axis of shaft 35, but is rotatably connected to shaft 35.

Sections 32 and 34 are engageable over their toothed surfaces 36 and 37 respectively where the faces 36 and 37 have fine teeth. By way of example, the faces can each have 210 fine teeth which are each approximately 0.030 inch high, with the total travel required of clutch section 34 necessary to engage section 32 being approximately 0.10 inch.

Clutch section 34 then has an annular groove 38 therein which receives the lower end of bell crank 39 which is pivoted on fixed pivot 40. The other end of bell crank 39 rides in notch 41 of timing cam 42 which is driven by shaft 43, which is carried in bearings 44 and 45. Shaft 43 has a sprocket 46 thereon which is driven from output sprocket 21 of speed reducer 23.

The shaft 35 has an output sprocket 47 which is connected to sprocket 48 of draw-roll 49. The draw-roll 49 engages draw-roll 50 with the web 10 of FIGURE 1 being drawn through draw-rolls 49 and 50 in the usual manner. This is schematically illustrated in FIGURE 2 where the draw-rolls 49 and 50 which rotate, as illustrated in the arrows, draw the web 10 in the direction illustrated by the arrows.

The operation of the system described to this point is as follows, it being assumed that the cam 42 is in a position to move clutch body 34 to the left so that the gear faces 36 and 37 engage:

As crank shaft 25 is rotated, the rack 29 engaging gear 31 will drive clutch body portion 34 and thus shaft 35 which is keyed to clutch body 34. This, in turn, will cause the draw-rolls 49 and 50 to rotate to advance web 10 by a predetermined amount which corresponds to the full length of a bag. The seal bar schematically illustrated as seal bar sections 51 and 52 are drawn together to seal the film panels while the knife 52a perforates the film when the complete pass is made.

It will be noted that the length of this pass is controlled by the movement of the rack 29 which is, in turn, controlled by the length of crank arm 28.

As the crank shaft 25 continues to rotate, it reaches a position where it would cause the direction of rotation of draw-rolls 49 and 50 to reverse.

At this point, however, the timing cam 42 is rotated to a position where the bell crank 39 is rotated counter-clockwise to move clutch body 34 out of engagement with clutch body 32. Thus, the continued motion of the rack 29 merely rotates clutch body 32 without transmitting this rotation to shaft 35 and the draw-rolls 49 and 50. The sealing operation of seal bars 51 and 52 occurs during this time and is initiated by other equipment, not shown, but well known to those skilled in the art.

As the cam 42 continues to rotate, it will re-engage clutch bodies 32 and 34, whereby the next drawing operation will proceed as described above.

In order to obtain a very close control of the relative positions between the sealed and perforated portions 12, 13 and 14 and the bottom of printed portions 11 respectively, shown in FIGURE 1, and in accordance with the present invention, a photoswitch 60 is mounted to scan the web 10 as the web 10 is pulled by draw-rolls 49 and 50. This photo-switch can be of any desired type with the "Optel Photoswitch" by LS20 produced by the Optel Production Company giving satisfactory results.

The output of photoswitch 60 is connected to an electromagnetic clutch 61 which has a first clutch body portion driven by shaft 62 which is pivoted in bearing 63 and driven by a drive sprocket 64 which is connected to sprocket 65 on shaft 43. The clutch 61 then has an output shaft 66 carried in bearing 67 which terminates in a bevel gear 68 which meshes with a driven bevel gear 69 carried on shaft 70 which is, in turn, carried by bearing 71 (FIGURE 3).

The electromagnetic clutch 61 may be of any desired type, it being necessary only that driving shaft 62 drive the driven shaft 66 responsive to the generation of a signal by photoswitch 60.

The output shaft 70 is carried in bearing 71 and has a drive screw 72 thereon (FIGURE 3) which cooperates with gear 73 on shaft 74 carried in bearing 75, as shown in FIGURE 2. The opposite end of shaft 74 then has a toothed face 76 which cooperates with toothed face 77 of clutch body 34.

When the automatic adjusting section described above is applied to the basic driving mechanism, the throw of the crank arm 28 is purposely decreased by 1/16 to 1/8 of an inch of its normal setting. Therefore, the web 10 will be advanced to all but a very small amount of its required advancement between seal bars 51 and 52.

Assuming that the seal bars 51 and 52 are engaged and performing a sealing operation, the clutch portions 32 and 34 are disengaged, while the clutch face 77 engages clutch face 76. The photoswitch 60 then measures the position of the printed section 11 and, until the printed section 11 assumes a proper relationship with respect to switch 60, will energize the electromagnetic clutch 61. This will cause shaft 62, which continually rotates, to be connected to shaft 66 so that shaft 70 and, thus, shaft 74 are caused to rotate. This, in turn, causes clutch body 34 to rotate drive shaft 35 and, thus, the draw-rolls 49 and 50. This drive will continue until the photoswitch 60 measures the appropriate position of the printed matter and de-energizes clutch 61 so that draw-rolls 49 and 50 stop advancing the web.

It will be recalled that the seal bars 51 and 52 have been engaged until this point, whereby the advancement of rolls 49 and 50 by the aforementioned 1/16 to 1/8 of an inch will cause a slight bow, indicated by dotted lines 80 in the material immediately in front of seal bars 51 and 52. Since adjustment of the position of web 10 occurs while the seal bars 51 and 52 are performing a sealing operation, no time is lost in performing the accurate adjustment of the web position as contrasted to sealing the web without fine adjustment.

After the seal has been appropriately made and the cam 42 comes to an appropriate position, the seal bars will be separated in the usual manner and clutch sections 32 and 34 will engage. This will cause draw-rolls 49 and 50 to drive the web 10 in the manner mentioned above to within the 1/16 to 1/8 inch of their final required position. During this operation, the bowed section 80 will be immediately driven through the open seal bar so that the proper length of film is advanced past the seal bars with the sealing taking place at an exactly measured position with respect to printing on the bag. During this sealing operation, the photoswitch 60 will again close clutch 61 so that the web 10 is again slightly advanced to an exactly correct position with respect to the printed matter on the back so that the following major advancement of the film will properly locate the film with respect to the seal bars 51 and 52 and knife 52a.

Although this invention has been described with respect to its preferred embodiments, it should be understood that many variations and modifications will now be obvious to those skilled in the art, and it is preferred, therefore, that the scope of this invention be limited not by the specific disclosure herein but only by the appended claims.

What is claimed is:

1. An indexing mechanism for advancing a web with respect to a web operating means comprising a uni-directional drive means, a crank mechanism connected to said drive means, a rack connected to said crank mechanism, a gear connected to said rack, a clutch means having input shaft means connected to said gear and an output clutch means, a drive shaft connected to said output clutch means and draw-roll means for advancing said web connected to said drive shaft, and a timed clutch operating means for connecting and disconnecting said input and output clutch means; said timed clutch operating means connecting said input and output clutch means over a first predetermined portion of the motion of said crank mechanism to permit constant step-type advancement of said web by said drive means; said timed clutch operating means disconnecting said input and output clutch operating means over a second predetermined portion of the motion of said crank mechanism to permit said crank mechanism to return to the beginning of its said first predetermined portion of motion without advancing said web, and an auxiliary web moving mechanism for advancing said web during said second portion of motion of said crank operating means; said auxiliary web moving mechanism being connected to said draw-roll means independently of said crank operating means; said auxiliary web moving mechanism including optical means for measuring the position of a predetermined, repetitive pattern on said web, and moving said web until said predetermined portion of said pattern moves to a predetermined position.

2. An indexing mechanism for advancing a web with respect to a web operating means comprising a uni-directional drive means, a crank mechanism connected to said drive means, a rack connected to said crank mechanism, a gear connected to said rack, a clutch means having input shaft means connected to said gear and an output clutch means, a drive shaft connected to said output clutch means and draw-roll means for advancing said web connected to said drive shaft, and a timed clutch operating means for connecting and disconnecting said input and output clutch means; said timed clutch operating means connecting said input and output clutch means over a first predetermined portion of the motion of said crank mechanism to permit constant step-type advancement of said web by said drive means; said timed clutch operating means disconnecting said input and output clutch operating means over a second predetermined portion of the motion of said crank mechanism to permit said crank mechanism to return to the beginning of its said first predetermined portion of motion without advancing said web, and an auxiliary web moving mechanism for advancing said web during said second portion of motion of said crank operating means; said auxiliary web moving mechanism being connected to said draw-roll means independently of said crank operating means, said auxiliary web moving mechanism including optical means for measuring the position of a predetermined, repetitive pattern on said web, and moving said web until said predetermined portion of said pattern moves to a predetermined position; said motion of said web by said auxiliary operating means being of the order of $1/16$ to $1/8$ inch, whereby said web will move past said web operating means by a distance determined by said first predetermined motion of said crank mechanism plus said distance of the order of $1/16$ to $1/8$ inch.

References Cited by the Examiner

UNITED STATES PATENTS

| | | | |
|---|---|---|---|
| 2,188,871 | 1/40 | Broekhuysen | 226—27 |
| 2,609,197 | 9/52 | McKenney et al. | 226—31 |
| 2,650,822 | 9/53 | Wyza | 226—33 |
| 2,731,262 | 1/56 | Morrow | 226—1 |
| 2,977,035 | 3/61 | Tilton et al. | 226—31 |
| 3,013,708 | 12/61 | Adams | 226—33 X |
| 3,053,425 | 9/62 | Baines | 226—3 |

ROBERT B. REEVES, *Acting Primary Examiner.*

ANDRES H. NIELSEN, RAPHAEL M. LUPO, ERNEST A. FALLER, JR., *Examiners.*